United States Patent
McNeill et al.

(10) Patent No.: US 10,534,858 B2
(45) Date of Patent: Jan. 14, 2020

(54) DOCUMENT VERSION OF INTEREST DISCOVERABILITY AND PERSISTENCE

(71) Applicant: Microsoft Technology Licensing, LLC., Redmond, WA (US)

(72) Inventors: Thomas Mattison McNeill, Cupertino, CA (US); Maura FitzGerald, Swampscott, MA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 390 days.

(21) Appl. No.: 14/992,917

(22) Filed: Jan. 11, 2016

(65) Prior Publication Data

US 2017/0199915 A1 Jul. 13, 2017

(51) Int. Cl.
| | |
|---|---|
| *G06F 16/10* | (2019.01) |
| *G06F 17/24* | (2006.01) |
| *G06F 3/0482* | (2013.01) |
| *G06F 16/18* | (2019.01) |
| *G06F 16/93* | (2019.01) |

(52) U.S. Cl.
CPC .......... *G06F 17/241* (2013.01); *G06F 3/0482* (2013.01); *G06F 16/1873* (2019.01); *G06F 16/93* (2019.01)

(58) Field of Classification Search
None
See application file for complete search history.

(56) References Cited

U.S. PATENT DOCUMENTS

| | | | |
|---|---|---|---|
| 6,266,682 B1 | 7/2001 | LaMarca et al. | |
| 6,272,678 B1 | 8/2001 | Imachi et al. | |
| 6,345,284 B1 | 2/2002 | Dinkelacker | |
| 6,931,590 B2 | 8/2005 | Kanie et al. | |
| 7,289,973 B2 | 10/2007 | Kiessig et al. | |
| 7,890,405 B1 * | 2/2011 | Robb | G06F 9/54 |
| | | | 705/35 |
| 8,856,088 B2 | 10/2014 | Havewala et al. | |

(Continued)

OTHER PUBLICATIONS

Egloff, Richard, "Google Tag Manager Update", Published on: Oct. 16, 2014, Available at: http://www.amazeemetrics.com/en/blog/google-tag-manager-update.

(Continued)

*Primary Examiner* — Jau Shya Meng

(74) *Attorney, Agent, or Firm* — Merchant & Gould P.C.

(57) ABSTRACT

Document version discoverability and persistence are provided. A version history of a document includes snapshots of the document as it is created and edited over time. When a version history for a document is invoked, a list of the previous versions of the document is generated for display. Certain versions may be more important to a user. Upon selection of a version, an option to append identification metadata to the selected version is displayed. Received text input is appended to the version of interest, and stored as identification metadata. When a user subsequently selects to view the version history of the document, the identification metadata are displayed with the version of interest, enabling the user to quickly and easily identify the version of interest. Additionally, the version of interest is prioritized, ensuring that it is persisted and not purged when older versions are removed from storage.

12 Claims, 15 Drawing Sheets

(56) References Cited

U.S. PATENT DOCUMENTS

| | | | |
|---|---|---|---|
| 2004/0015369 A1 | 1/2004 | Kim et al. | |
| 2005/0216827 A1 | 9/2005 | Mochizuki | |
| 2006/0225065 A1* | 10/2006 | Chandhok | G06F 11/1458 717/168 |
| 2010/0138756 A1* | 6/2010 | Saund | H04L 12/1827 715/758 |
| 2010/0312754 A1* | 12/2010 | Bear | G06F 11/1448 707/685 |
| 2011/0116431 A1* | 5/2011 | Endoh | H04N 5/44543 370/312 |
| 2011/0252301 A1* | 10/2011 | Vollmer | G06F 16/904 715/229 |
| 2013/0326323 A1* | 12/2013 | Siwoff | G06F 17/2288 715/229 |
| 2014/0095456 A1 | 4/2014 | Pidduck | |

OTHER PUBLICATIONS

Olofsson, Kristoffer, "A Guide to Google Tag Manager for Mobile Apps", Published on: Dec. 6, 2013, Available at: http://online-behavior.com/analytics/mobile-apps-tag-manager.

"Tag and Retrieve Versions of Project Files", Retrieved on: Sep. 8, 2015, Available at: http://in.mathworks.com/help/simulink/ug/tag-and-retrieve-versions-of-project-files.html#responsive_offcanvas.

"Version Control", Retrieved on: Sep. 8, 2015, Available at: http://rrcns.readthedocs.org/en/latest/version_control.html.

Azad, Kalid, "A Visual Guide to Version Control", Published on: Oct. 12, 2007, Available at: http://betterexplained.com/articles/a-visual-guide-to-version-control/.

Chacon, Scott, "Git Basics—Tagging", Published on: Mar. 17, 2008, Available at: https://git-scm.com/book/en/v2/Git-Basics-Tagging.

"WinCvs—Daily Use Guide", Published on: Aug. 27, 2003, Available at: http://cvsgui.sourceforge.net/howto/.

Bertram, Becky, "Applying Document Retention in SharePoint", Published on: Oct. 3, 2011, Available at: http://blogs.msdn.com/b/mvpawardprogram/archive/2011/10/03/applying-document-retention-in-sharepoint-2010.aspx.

"Purge Document Versions", Retrieved on: Sep. 8, 2015, Available at: http://www.ic.nc.gov/livelinksupport/help/webdoc/fn_purge_version_p.html.

"Monitoring and Maintaining Your CQ instance", Retrieved on: Sep. 8, 2015, Available at: https://docs.adobe.com/docs/en/cq/5-6-1/deploying/monitoring_and_maintaining.html.

* cited by examiner

FIG. 2A

History: Contoso Proposal

- Title Slide — Title Layout
- Title and Content — First Bullet, Second Bullet, Third Bullet
- (bar chart slide)
- Two column layout with table

Two column layout with table

- First bullet goes here
- Second bullet goes here
- Third bullet goes here

| | Value 1 | 25 |
| | Value 2 | 27 |
| | Value 3 | 29 |

Item 1
Item 2
Item 3

206 — 118

Save a copy — Restore this version

Current Version
📞 10:25 AM
Alice Brown called Bob Cook — 208

Today, January 1, 2020
✏️ 9:47 AM / 212
Alice Brown edited
102
214

♥ 9:43 AM
Alice Brown started co-authoring

✉ 9:25 AM
Bob Cook emailed Alice Brown

Yesterday, December 31, 2019
✏️ 6:15 PM 204
200
118
120a
120b
120c
120d
202

DOCUMENT VERSION OF INTEREST DISCOVERABILITY AND PERSISTENCE

BACKGROUND

Applications are increasingly utilizing auto-save functions to automatically save documents without requiring users to explicitly command an application to save a document. For example, as a user edits a document, an application may automatically save the document at predetermined intervals, which helps to reduce the risk or impact of data loss. The client edits may be saved to a current version of the document. At appropriate times, a new version of the document is created, and client edits are saved to the new version and archived in a document version history. Accordingly, a single document may have a plurality of versions associated with it, wherein each version includes client edits made to the document from the last save of the previous version.

A navigable list of previous versions of a document can be viewed by a user, enabling the user to access previous versions of the document. For example, a user may want to locate and view a particular version, see how a document has evolved over time, revert to a previous version, etc. Oftentimes, versions of a document are identifiable by metadata associated with the document version, such as a date and time the version was created, an activity or event triggering the creation of the version, a user associated with the activity or event triggering the creation of the version, etc.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and device for appending identification metadata to a selected document version for providing discoverability of the version in a document version history and for persisting the document version in a storage repository.

Client edits made to a document via an application are automatically saved. At predetermined intervals, or in response to certain events, a copy of the document is made and stored as a new version. Accordingly, as a document is created and edited, a history of the evolution of the document is stored and associated with the document. When a document version history for a document is invoked, a user interface including a list of the previous versions of the document is generated for display in an application user interface.

Certain versions may be more important or useful to a user. Upon selection of a version of interest, various options are displayed, including an option to append identification metadata to the version of interest. When text input is received, the input is saved and appended to the version of interest of the document, and stored as identification metadata.

When a user subsequently selects to view a display of the document version history of the document, the identification metadata are displayed with the particular version to which they were appended. Accordingly, the user is enabled to quickly and easily identify the version that is important or useful to the user, thus improving discoverability of useful information and improving usability of the application.

Additionally, when identification metadata are appended to a version of interest, the document version is designated as a priority version, thus ensuring that it is persisted and not purged when older versions are removed from storage.

Examples are implemented as a computer process, a computing system, or as an article of manufacture such as a device, computer program product, or computer readable medium. According to an aspect, the computer program product is a computer storage medium readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIGS. 2A-2E are illustrations of an example user interface for displaying a document version history, and allowing a user to append identification metadata to a particular document version;

DETAILED DESCRIPTION

Figure 1A:
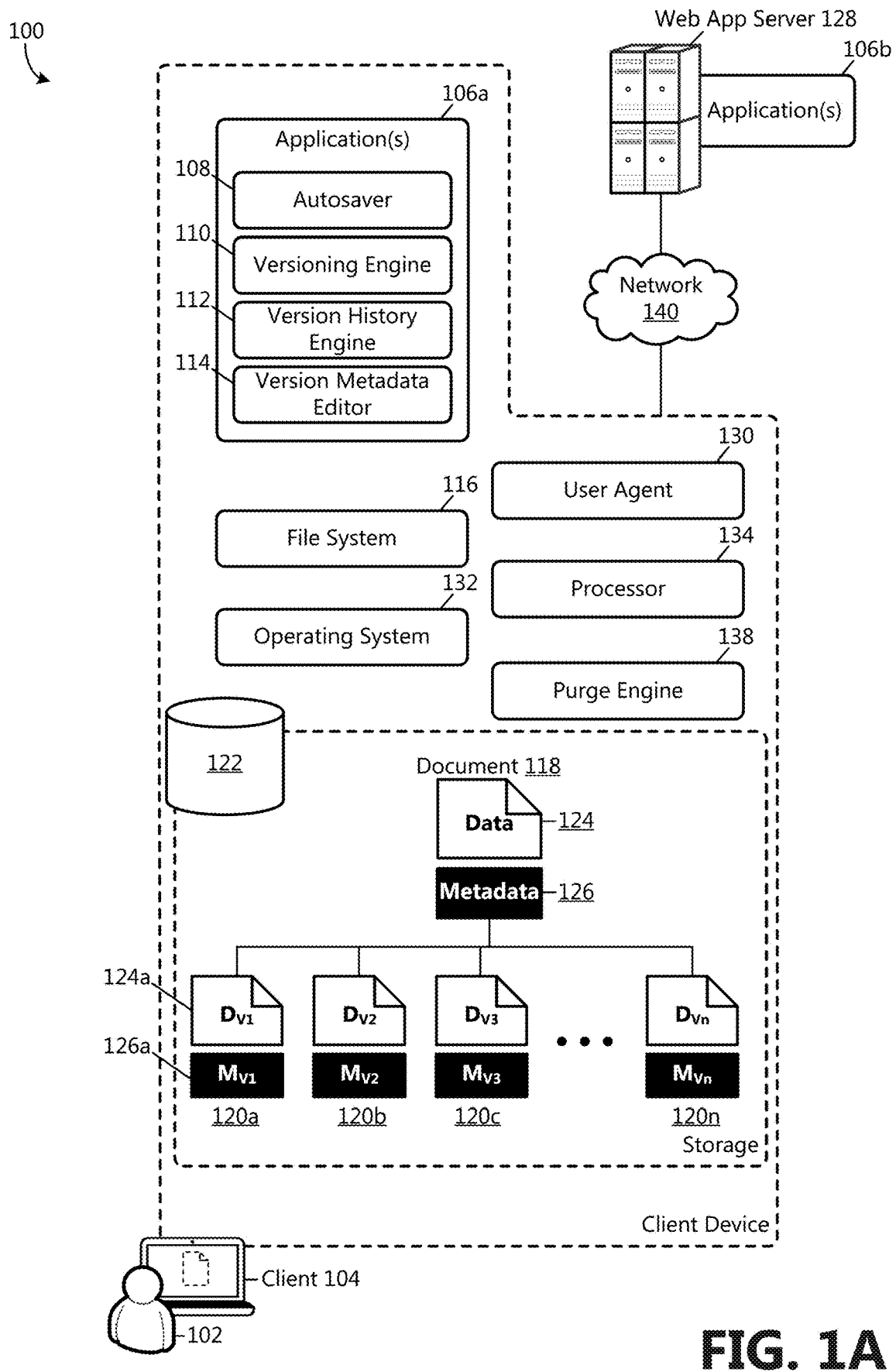
FIGS. 1A and 1B are block diagrams illustrating example systems for providing discoverability of the version in a document version history and for persisting the document version in a storage repository.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer storage medium for appending identification metadata to a selected document version for providing discoverability of the version in a document version history and persisting the document version in a storage repository.

Figure 1B:
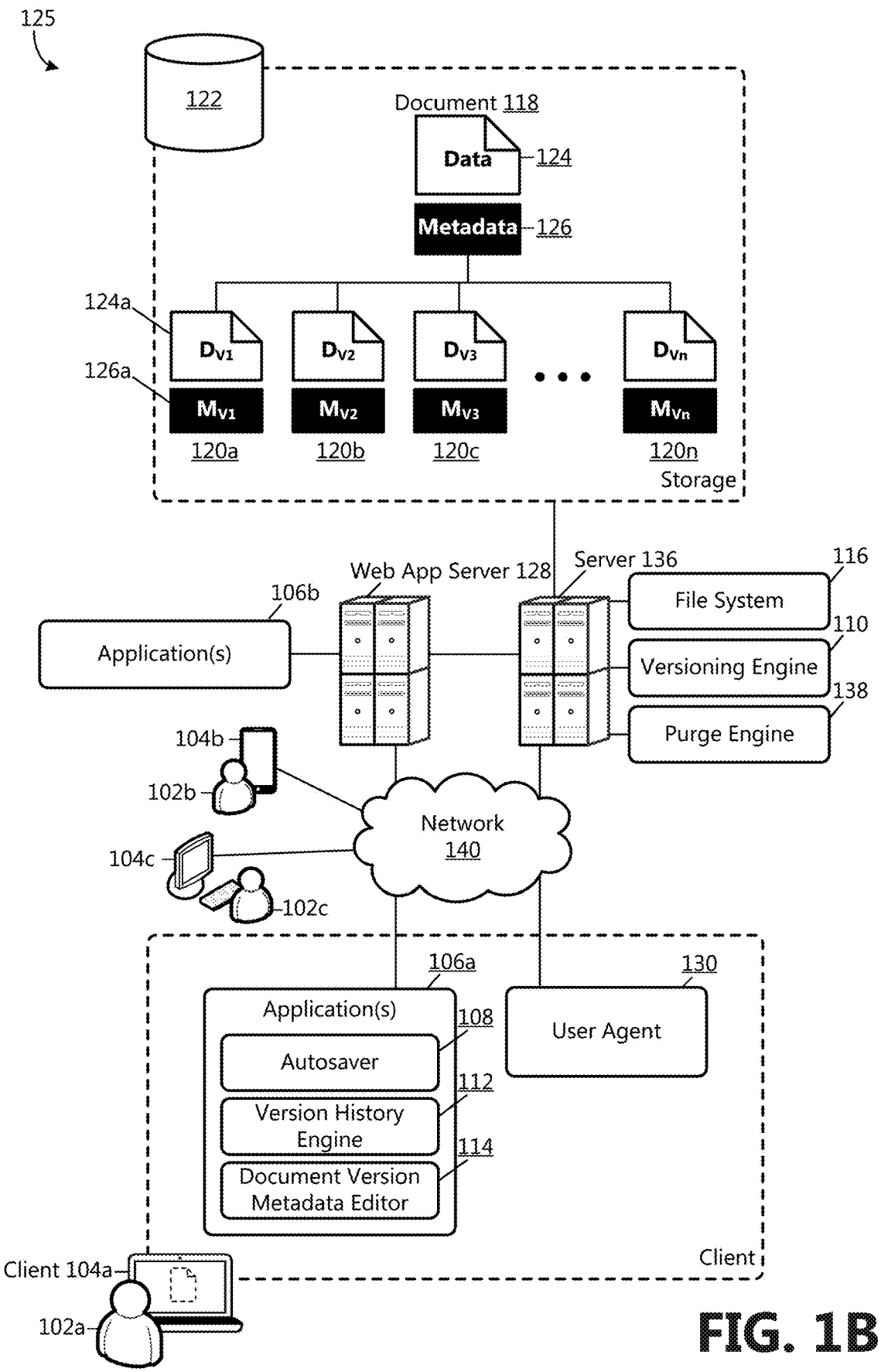

FIGS. 1A and 1B are block diagrams illustrating example systems 100, 125 for improved selected document version discoverability and persistence. FIG. 1A includes aspects of an example client-based system 100, and FIG. 1B includes aspects of an example combined client-and-server system 125 for enabling appendage of identification metadata to a version of interest for improving discoverability of the version of interest in a document version history and persisting the document version in a storage repository.

The example systems 100, 125 include a client device 104 illustrative of one of various types of computing devices (e.g., a tablet computing device, a desktop computer, a mobile communication device, a laptop computer, a laptop/tablet hybrid computing device, a large screen multi-touch display, a gaming device, a smart television, a wearable device, or other type of computing device) for executing applications 106a,b (collectively, 106) for performing a variety of tasks.

The example combined client-and-server system 125 illustrated in FIG. 1B includes a collaboration and/or document management server (herein referred to as server 136), illustrative of portal-based computing system for collaboratively creating, managing, and sharing electronic documents 118. In some examples, the server 136 is a shared resources server located at an enterprise, accessible by various client devices 104a-c (collectively, 104). In other examples, the server 136 is a shared resources server remotely located from the various client devices 104, at which various client users 102a-c (collectively, 102) may store and collaborate on various documents 118. The client devices 104 are operative to communicate with the server 136 via a network 140, such as, but not limited to, the Internet, wide area networks, local area networks, and combinations thereof.

With reference again to both FIGS. 1A and 1B, a user 102 of a client device 104 may utilize an application 106 executing on the client device 104 for a variety of tasks, which may include, for example, to write, calculate, draw, organize, prepare presentations, send and receive electronic mail, take and organize notes, make music, and the like. Applications 106 may include thick client applications 106a, which are stored locally on the client device 104, or may include thin client applications 106b (i.e., web applications) that reside on a remote server (e.g., web application server 128) accessible over a network 140, such as the Internet, an intranet, a local area network, a wide area network, or combinations thereof. A thin client application 106b may be hosted in a browser-controlled environment or coded in a browser-supported language and reliant on a user agent 130, such as a common web browser, to render the application 106b executable on the client device 104. According to an aspect, the application 106 is a program that is launched and manipulated by an operating system 132, and manages content published on a display screen. According to an example, the operating system 132 runs on a processor 134, and supports execution of the applications 106.

According to an aspect, an autosaver 108 is included in, or functionally exposed to, the application 106, for example, via an application programming interface (API). The autosaver 108 is illustrative of a software module, system, or device operative to automatically save a document 118 without requiring a client user 102 to explicitly command the application 106 to save the document 118. For example, as a client user 102 edits a document 118, the autosaver 108 may automatically save the document 118 at predetermined intervals or upon detection of certain events. Accordingly, any edits made to the document 118 by the client user 102 since a last save of the document 118 are saved to the current version of the document 118.

In saving a document 118, the autosaver 108 directs a file system 116, illustrative of a software module, system, or device, to store the document 118 in a storage repository 122 included in, or external to, the client device 104. For example, in a client-based system 100 (FIG. 1A), the file system 116 and storage repository 122 may be local to the client device 104, while in a combined client-and-server system 125 (FIG. 1B), the file system 116 and storage repository 122 may be external to the client device 104, such as on one or more servers 136, and accessible to the client device 104 via a network 140 as described above. According to an example, the autosaver 108 identifies any changes made to the document 118 since the last save, and directs the file system 116 to store the changes to the current version of the document 118 stored in the storage repository 122.

According to an aspect, a versioning engine 110 is illustrative of a software module, system, or device operative to determine when to create a new version of the document 118, generate a version identifier for the new version of the document 118, and direct the file system 116 to store client edits to the new version. In some examples, the versioning engine 110 is included in the application 106. In other examples, the versioning engine 110 is functionally exposed to the application 106, for example, via an API. The versioning engine 110 may be client-based, as illustrated in FIG. 1A, or may be server-based, as illustrated in FIG. 1B.

According to an aspect, the versioning engine 110 is operative to generate a new version in response to a user command, at predetermined intervals, or upon detection of certain events or actions associated with the document 118 (e.g., sharing the document, renaming the document, emailing the document, attaching the document to an online call or meeting, editing the document, starting a co-authoring session for the document, restoring the document to a previous version). According to an aspect, when a new version of a document 118 is created, the versioning engine 110 is operative to save the actual document data 124 and metadata 126 associated with the creation of the new version, such as a date and time the version was created, an activity or event triggering the creation of the version, a user 102 associated with the activity or event triggering the creation of the version, etc.

According to an aspect, one or more previous versions 120a-n (collectively, 120) of a document 118 are archived in the storage repository 122. Each previous version 120 is stored separately and indexed as a version of the document 118. A document version 120 includes document data 124 (i.e., the contents of the document 118 when the last save of client edits was made to the version 120) and associated metadata 126, as described above.

According to an example, when a document 118 is opened in an application 106, a user 102 may selectively invoke a display of a historical list of versions 120 of the document 118. According to an aspect, a version history engine 112 is included in, or functionally exposed to, the application 106, for example, via an API. The version history engine 112 is illustrative of a software module, system, or device operative to query the storage repository 122 via the file system 116 for versions 120 of a document 118, and generate a list of the versions 120 for display in a user interface, so that a user 102 may selectively open, view, or interact with a previous version 120 of the document 118. According to an example, the list of versions 120, herein referred to as a document version history, is displayed in a user interface of the application 106. An example document version history is illustrated in FIGS. 2A-D, and will be described in detail further below.

In some examples, versions 120 included in a document version history are represented by their associated metadata 126, for example, by one or more of a date and time stamp of the creation of the version 120, an activity or event that triggered the creation of the version 120, and a user 102 associated with the activity or event that triggered the creation of the version 120.

According to an aspect, a version metadata editor 114 is included in, or functionally exposed to, the application 106, for example, via an API. The version metadata editor 114 is illustrative of a software module, system, or device operative to enable appending of additional metadata to a selected version 120 for improving discoverability of the version 120 in a document version history. For example, the version metadata editor 114 provides user interface elements that allow a user 102 to selectively add identification metadata to a selected version of interest. According to an example, a user 102 may add identification metadata to a version 120 that are meaningful to the user, or to a group of users, so that the version 120 is distinct from the other versions and easily identifiable. For example, if a particular version 120 of a document 118 were included in a presentation to a particular group, the user 102 may append "presented to marketing group" as identification metadata, or if the version 120 were included in a print piece, the user 102 may append "sales brochure" as identification metadata.

The version metadata editor 114 is further operative to instruct the file system 116 to save the appended identification metadata to the version of interest of the document 118 stored in the storage repository 122. When a user 102 subsequently selects to view a display of the document version history of the document 118, the identification metadata are displayed with the version of interest to which they were appended. Accordingly, the user 102 is enabled to quickly and easily identify the version 120. As can be appreciated, enabling appending of user-meaningful identification metadata to a document version 120 improves discoverability of versions of interest, thus advantageously improving usability of the application 106. Additionally, when a user 102 is able to advantageously identify and open a version of interest without having to open different versions to find the particular version of importance, processor load is reduced.

According to an example, a purge engine 138, illustrative of a software module, system, or device, is operative to direct the file system 116 to purge content from the storage repository. In some examples, the purge engine 138 is client-based, as illustrated in FIG. 1A. In other examples, the purge engine 138 is server-based, as illustrated in FIG. 1B. According to an aspect, the purge engine 138 is operative to make a determination to purge one or more document versions 120 according to one or more determining factors (e.g., maximum number, age).

According to another aspect, when a user 102 selectively adds identification metadata to a version of interest, the version metadata editor 114 is further operative to prioritize the particular version 120. For example, the version metadata editor 114 marks the version of interest as a prioritized version 120, such that when older versions are purged from the storage repository 122 via the purge engine 138 (e.g., to free up storage space), versions 120 that are prioritized are persisted, and not purged. In some examples, prioritized versions 120 are moved to the end of a purge queue, such that a prioritized version 120 is only purged if necessary (e.g., all non-prioritized versions have been purged, and storage is at capacity).

According to an aspect and as illustrated in FIG. 2A, a user interface 200 is generated for displaying a document version history 202, so that a user 102 is enabled to view and interact with document versions 120. According to an example, the user interface 200 may be generated and displayed in response to a user selection of a "versions" or "history" menu item displayed in an application user interface 204. For example, when a current version of a document is opened in an application 106 and displayed in a document editing window 206 of the application user interface 204, a user 102 may select to view a list of previous versions 120 of the document 118. Accordingly, a list of versions 120a-d associated with the document 118 are retrieved from the storage repository 122, and is displayed as the document version history 202 in the user interface 200.

According to an example, the document versions 120 listed in the document version history 202 are arranged in order from a most recent version to an oldest version. According to another example, each document version 120 may be represented by one or more pieces of the version's associated metadata 126, for example, by one or more of a date 208 and time stamp 210 of the creation of the version 120, an activity or event 212 that triggered the creation of the version 120, a glyph 214 or icon representative of the activity or event 212 that triggered the creation of the version 120, and a user 102 associated with the activity or event that triggered the creation of the version 120.

Figure 2B:
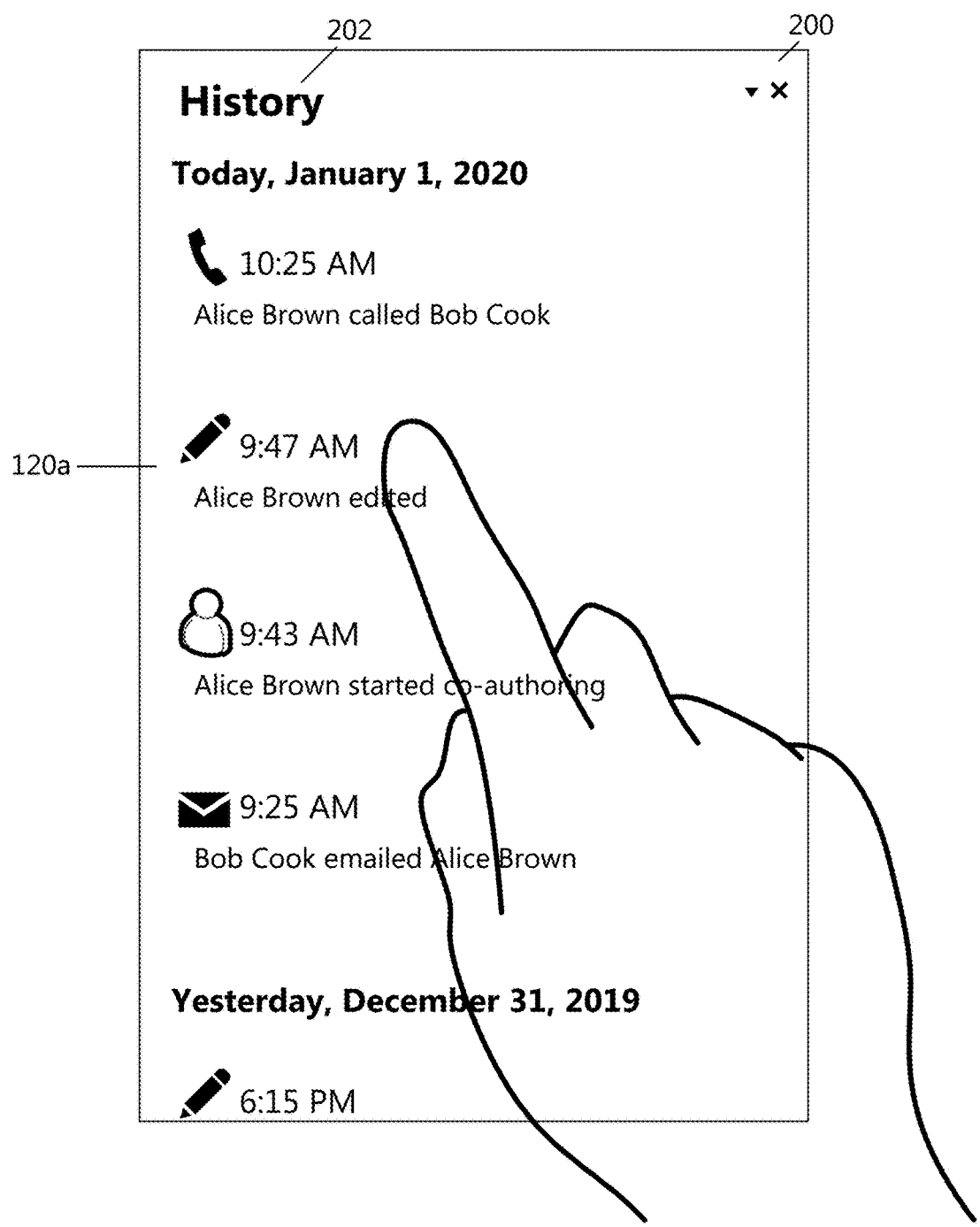

According to an aspect, and as illustrated in FIG. 2B, the document versions 120 listed in the document version history 202 are selectable. For example, a user 102 may select a document version 120a to restore the version 120a, copy the version 120a, share the version 120a, or to add identification metadata to the version 120a.

Figure 2C:
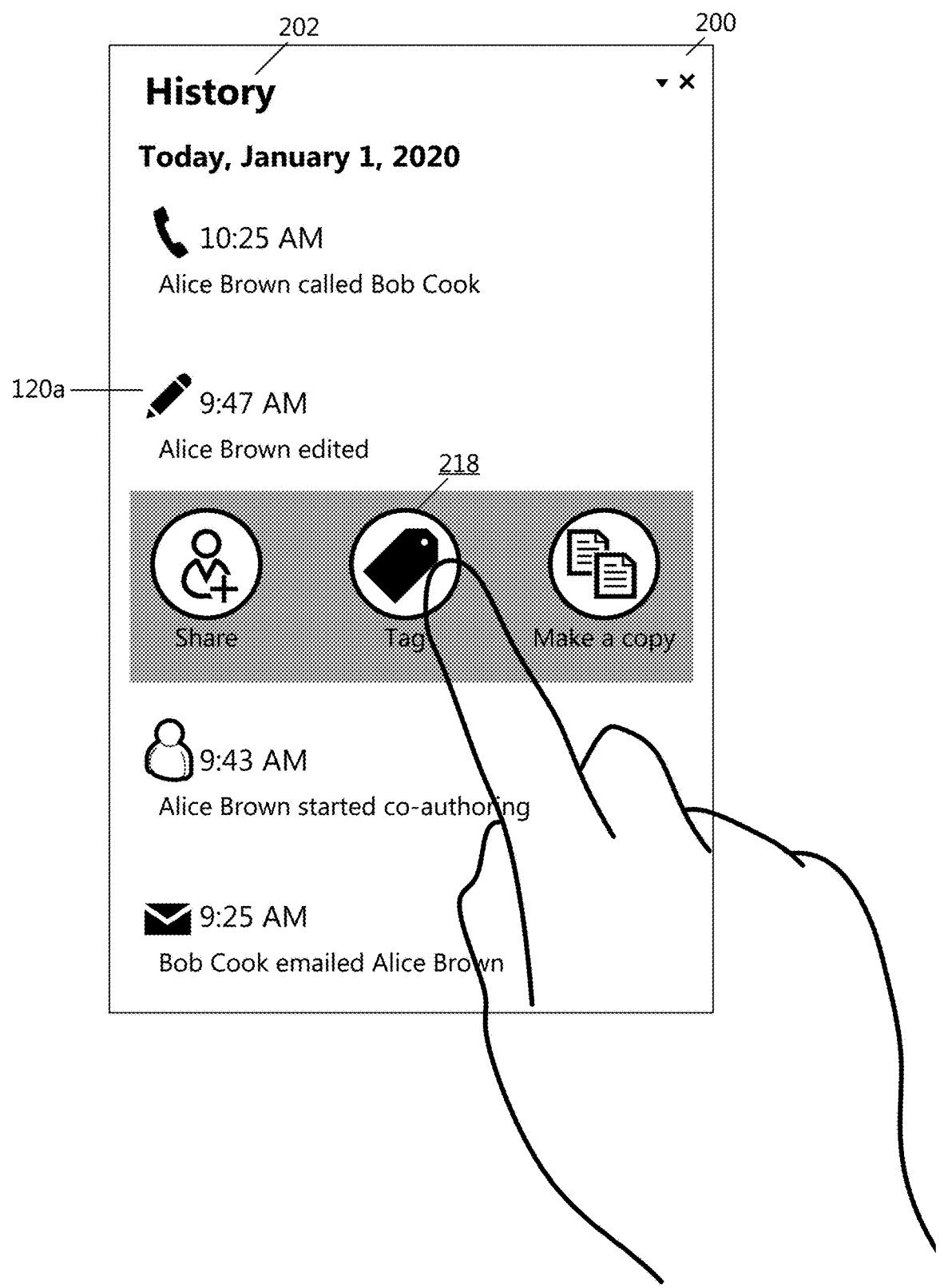

According to an aspect and as illustrated in FIG. 2C, upon selection of a particular version of interest listed in the document version history 202, various options are displayed in the user interface 200, including a selectable option 218 to add identification metadata to the version 120a. In some examples, the selectable option 218 may be identified as a "tag" option, a "keep" option, a "snap" option, a "flag" option, a "name" option, or other like option.

Figure 2D:
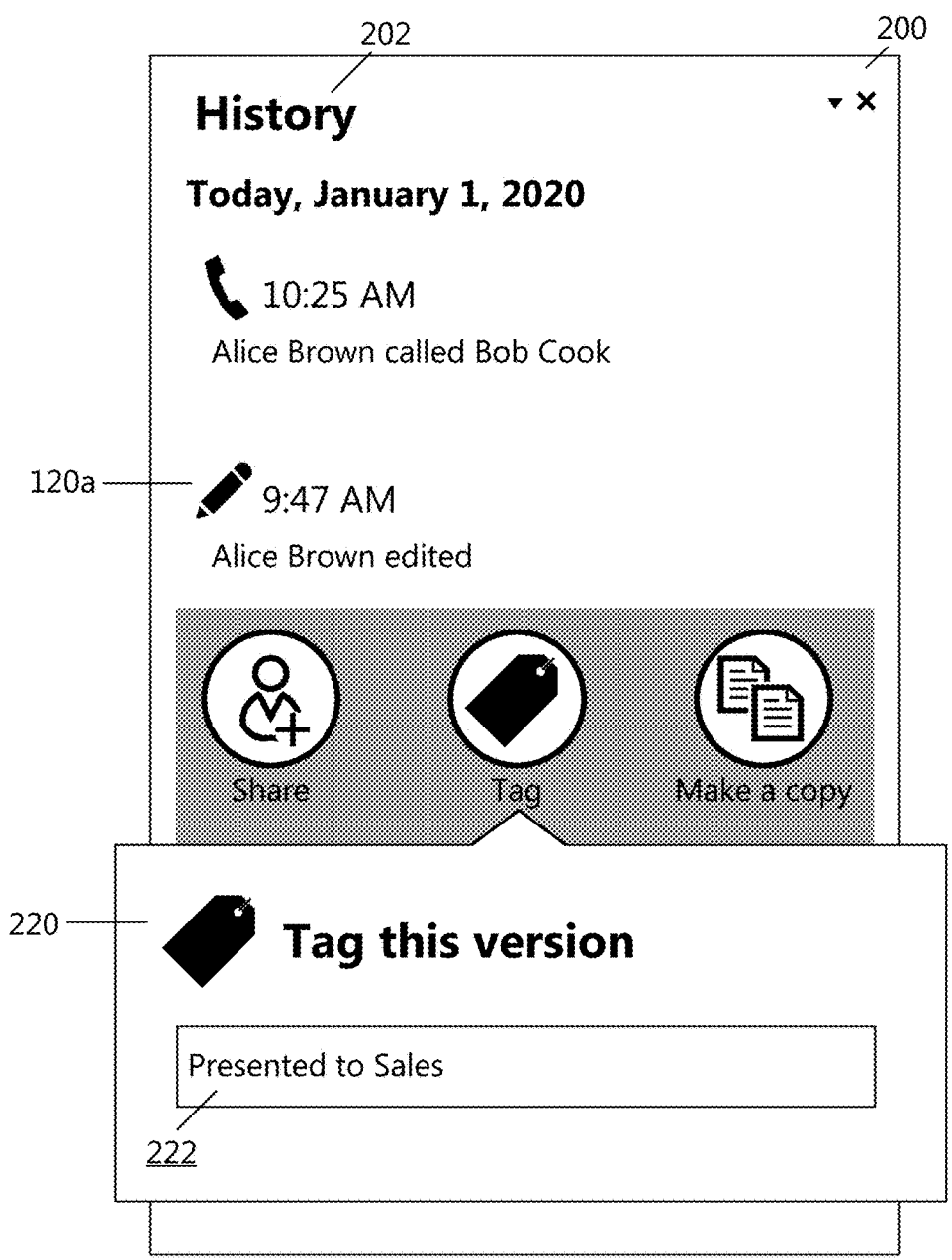

According to an aspect and as illustrated in FIG. 2D, upon selection of the option 218, a user interface element 220 is displayed, allowing the user 102 to enter text 222 to append as identification metadata to the document version of interest 120a. For example, the user may enter text 222 to associate with the version of interest 120a that is meaningful to the user 102, or to a group of users, that distinguishes the document of interest 120a from other versions 120, so that the version of interest 120a can be easily discovered amongst a listing of other versions 120. In the example illustrated in FIG. 2D, the user 102 enters "presented to sales." For example, the version of interest 120a may be the version 120a of the document 118 that was presented to a sales group, and which the user 102 may want to make easily discoverable in the document version history 202 in the future.

Figure 2E:
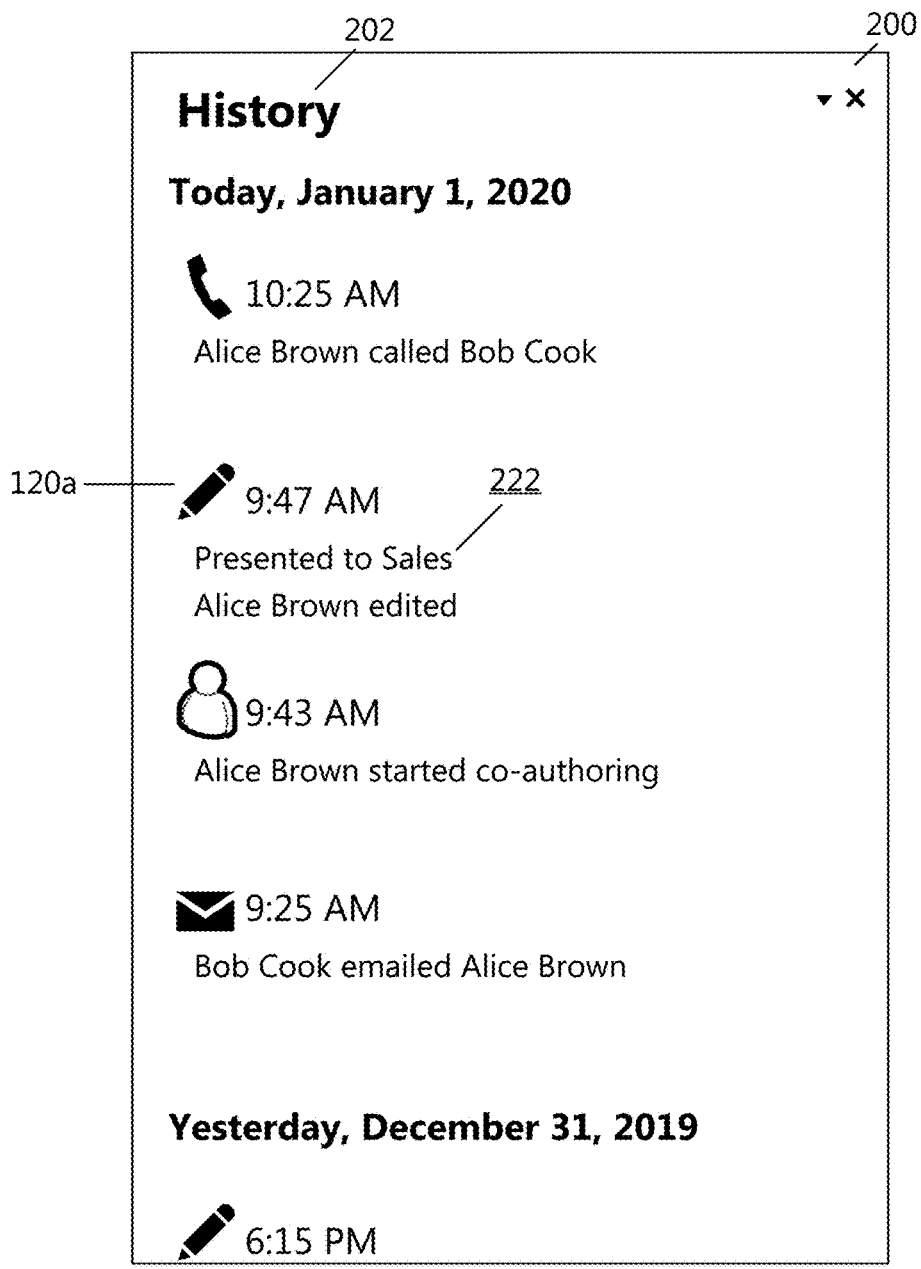

According to an aspect, the text 222 entered by the user 102 is appended to the version of interest as identification metadata, and upon subsequent viewing of the document version history 202 of the document 118, the identification metadata text 222 is displayed in association with the version of interest 120a, as illustrated in FIG. 2E.

Figure 3A:
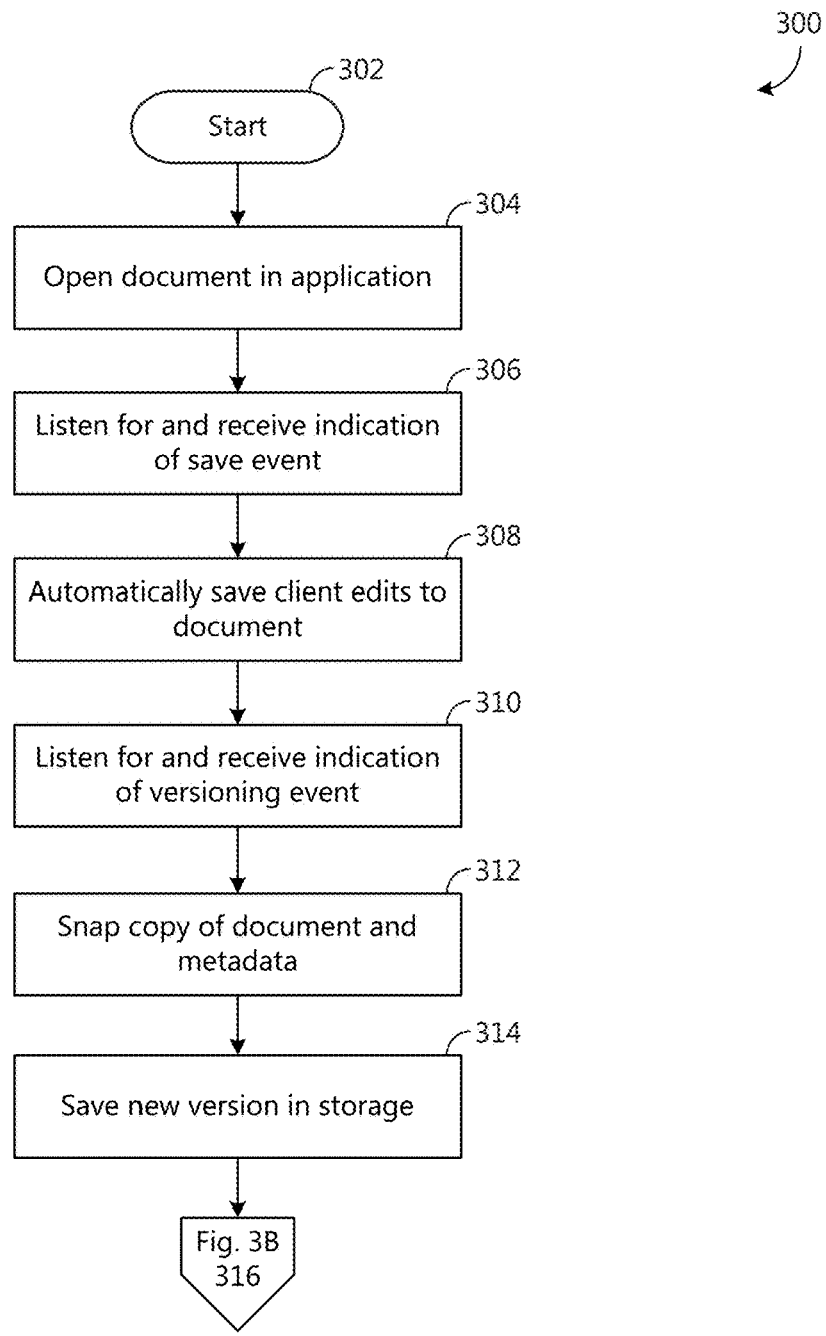
FIGS. 3A-3D is a flow chart showing general stages involved in an example method for providing discoverability of and persisting a document version in a document version history.

Having described example operating environments with respect to FIGS. 1A and 1B, and an example user interface 200 as described in FIGS. 2A-2E, FIGS. 3A-3D are flow charts showing general stages involved in an example method 300 for providing discoverability of and persisting a document version in a document version history. FIG. 3A shows general stages involved in an example method for autosaving and creating a new version of a document 118. With reference now to FIG. 3A, the method 300 begins at start OPERATION 302, and proceeds to OPERATION 304, where a document 118 is opened in an application 106 executing on a client device 104 or rendered executable the on the client device 104 via a user agent 130. For example, a user 102 may make client edits to the document 118 using the application 106.

The method 300 proceeds to OPERATION 306, where the autosaver 108 listens for and receives an indication of save event, which may be based on a time interval, content changes, etc. The method 300 continues to OPERATION 308, where the client edits are automatically saved to the document 118. For example, the autosaver 108 identifies content changes made to the document 118 since the last save, and directs the file system 116 to store the changes to the current version of the document 118 stored in the storage repository 122.

At OPERATION 310, the versioning engine 110 listens for and receives an indication of a versioning event, for example, a user command, a predetermined time interval, or a detection of an event or action associated with the document 118 (e.g., sharing the document, renaming the document, emailing the document, attaching the document to an online call or meeting, editing the document, starting a co-authoring session for the document, restoring the document to a previous version).

The method 300 proceeds to OPERATION 312, where the versioning engine 110 creates a snapshot (i.e., new version) of the document 118, and captures the metadata associated with the creation of the new version, such as a date and time the version was created, an activity or event triggering the creation of the version, a user 102 associated with the activity or event triggering the creation of the version, etc.

At OPERATION 314, the versioning engine 110 directs the file system 116 to store the new version of the document 118 (i.e., document data 124) and the metadata 126 in the storage repository 122.

Figure 3B:
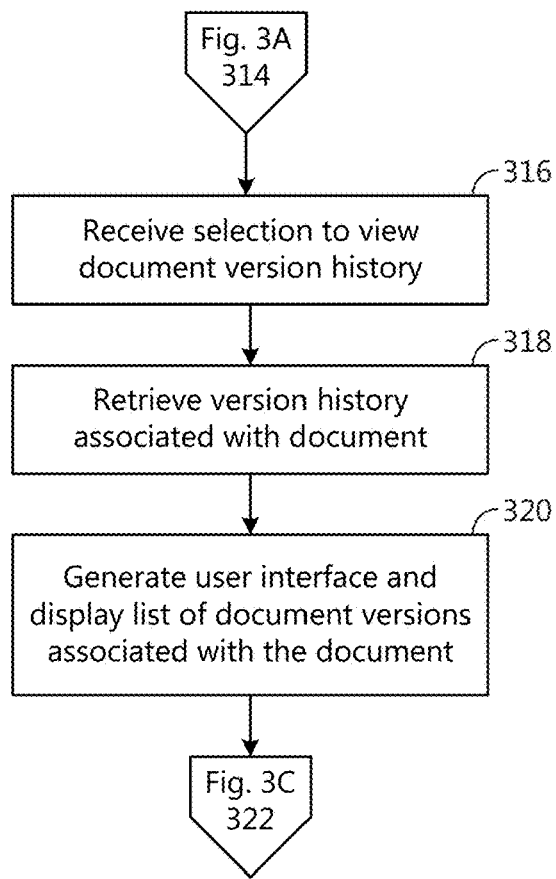

The method 300 continues to FIG. 3B, where a next series of stages in an example method for generating a display of previous versions 120 associated with a document 118 is shown. With reference now to FIG. 3B, the method 300 continues to OPERATION 316, where a selection to view the document version history 202 is received. For example, the user 102 may select a "versions" or "history" menu item displayed in the application user interface 204.

The method 300 proceeds to OPERATION 318, where the version history associated with document 118 is retrieved from the storage repository 122, and at OPERATION 320, the version history engine 112 generates a list of the versions 120 for display in a user interface so that a user 102 may selectively open, view, or interact with a previous version 120 of the document 118. According to an example, the document version history 202 listing the document versions 120 is displayed in a user interface.

Figure 3C:
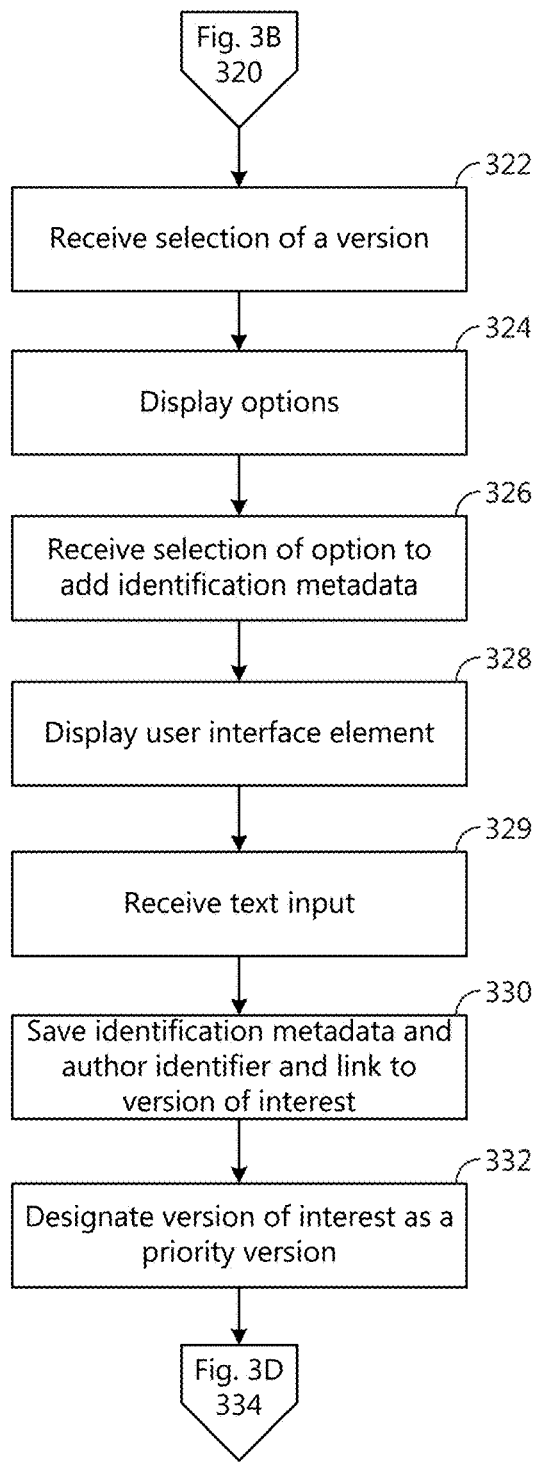

The method 300 continues to FIG. 3C, where a next series of stages in an example method for receiving and attaching identification metadata to a version of interest 120a of a document 118 is shown. With reference now to FIG. 3C, the method 300 continues to OPERATION 322, where an indication of a selection of a version 120 listed in the document version history 202. In some examples, when a version of interest 120a is selected, an image of the document data 124 is displayed in a display area of the application user interface 204.

The method 300 proceeds to OPERATION 324, where various options are displayed in the user interface 200, including a selectable option 218 to add identification metadata to the version of interest 120a.

At OPERATION 326, an indication of a selection of the option 218 to add identification metadata is received, and at OPERATION 328, a user interface element 220 is displayed, allowing the user 102 to enter text 222 to append as identification metadata to the version of interest 120a.

The method 300 continues to OPERATION 329, where user input is received. For example, the user may enter text 222 to associate with the version of interest 120a that is meaningful to the user 102, or to a group of users, that distinguishes the version of interest 120a from other versions 120, so that the version of interest 120a can be easily discovered amongst a listing of other versions 120.

The method 300 proceeds to OPERATION 330, where the text 222 input is saved as identification metadata, linked to the version of interest 120a, and stored in the storage repository 122.

At OPERATION 332, the version of interest 120a is designated as a priority version. According to an aspect, when a document version 120 is designated as a priority version of the document 118, it is flagged as a version to persist in the storage repository 122.

Figure 3D:
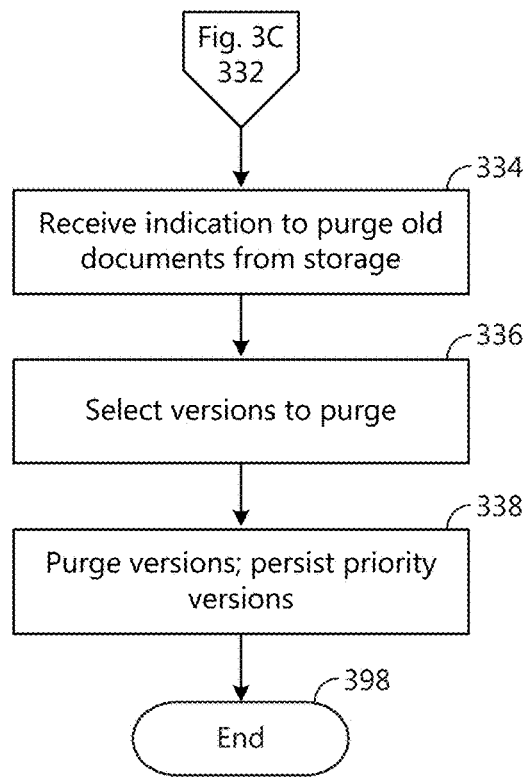

The method 300 continues to FIG. 3D, where a next series of stages in an example method for persisting the prioritized version of interest 120a in the document version history 202 is shown. With reference now to FIG. 3D, the method 300 continues to OPERATION 334, where the purge engine 138 listens for and receives an indication of a purge event, such as a predetermined time interval, reaching a predetermined maximum number of versions 120 of a document 118 in the storage repository 122, reaching a predetermined maximum amount of storage space available to versions 120 of a document 118 or documents 118, versions 120 reaching a predetermined maximum age, etc.

The method 300 proceeds to OPERATION 336, where the purge engine 138 selects which document versions 120 to purge from the storage repository 122. In some examples, the purge engine 138 selects a predetermined number of versions 120 beginning with the oldest versions 120. In some examples, the purge engine 138 selects versions 120 that meet or exceed a predetermined age. In some examples, the purge engine 138 selects versions based on size. According to an aspect, the purge engine 138 identifies the versions 120 that are designated as priority versions, and does not include them in the selection, for example, the version of interest 120a.

The method 300 continues to OPERATION 338, where the purge engine 138 directs the file system 116 to delete the selected versions 120 from the storage repository 122, with the exception of the priority versions, including the version of interest 120a. The method 300 concludes at end OPERATION 398.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
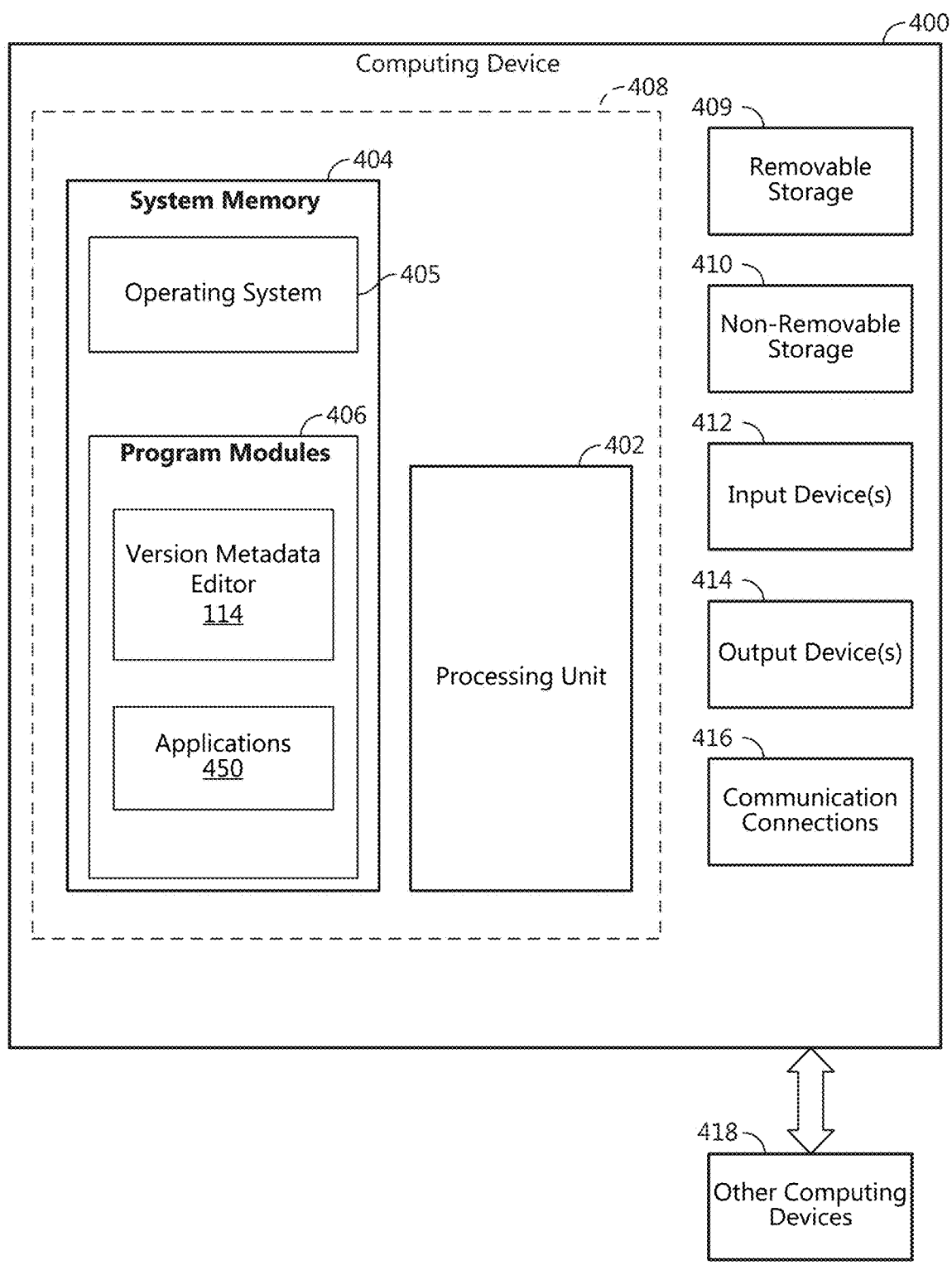
FIG. 4 is a block diagram illustrating example physical components of a computing device.
Figure 5A:
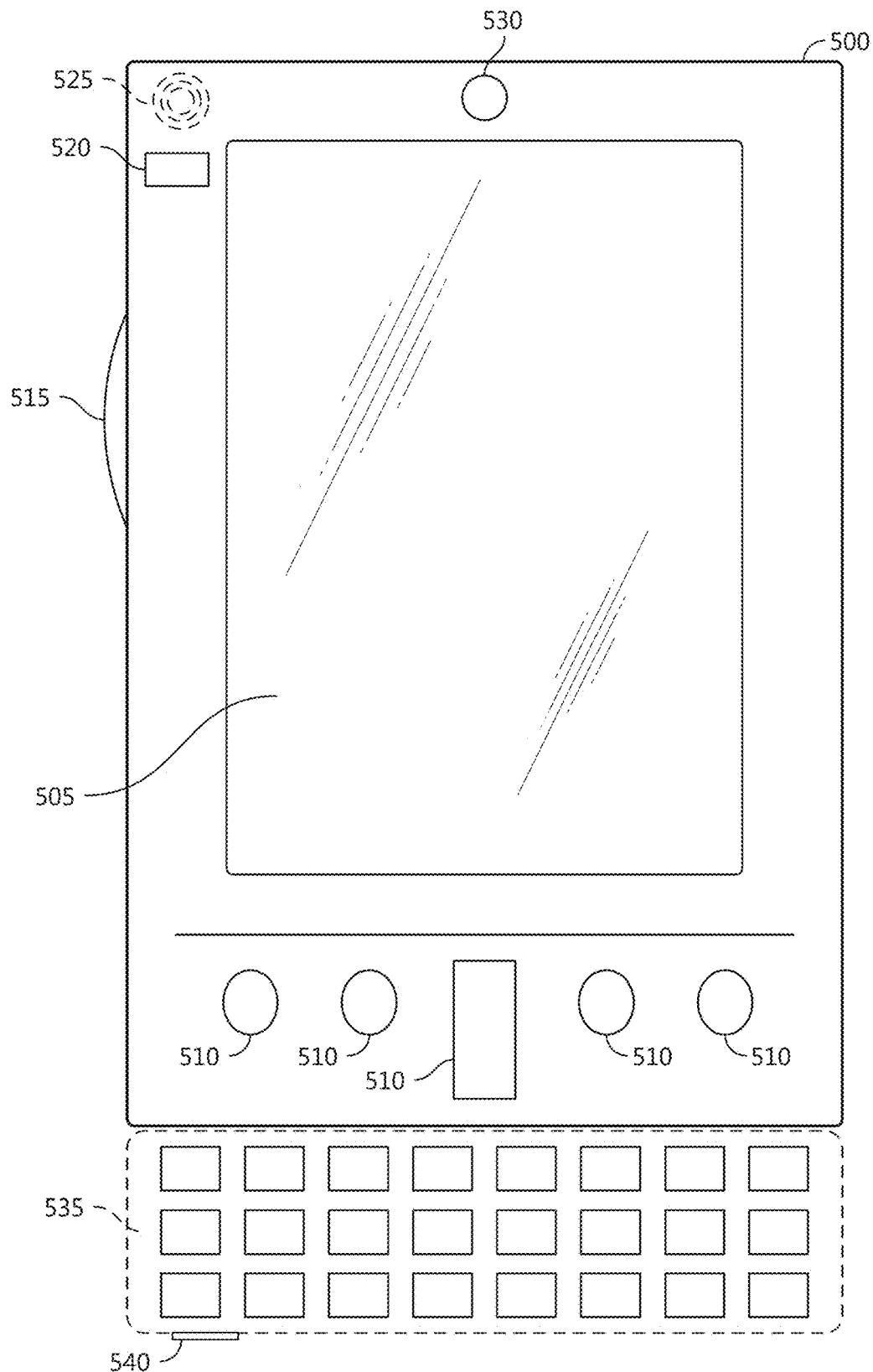
FIGS. 5A and 5B are block diagrams of a mobile computing device.
Figure 5B:
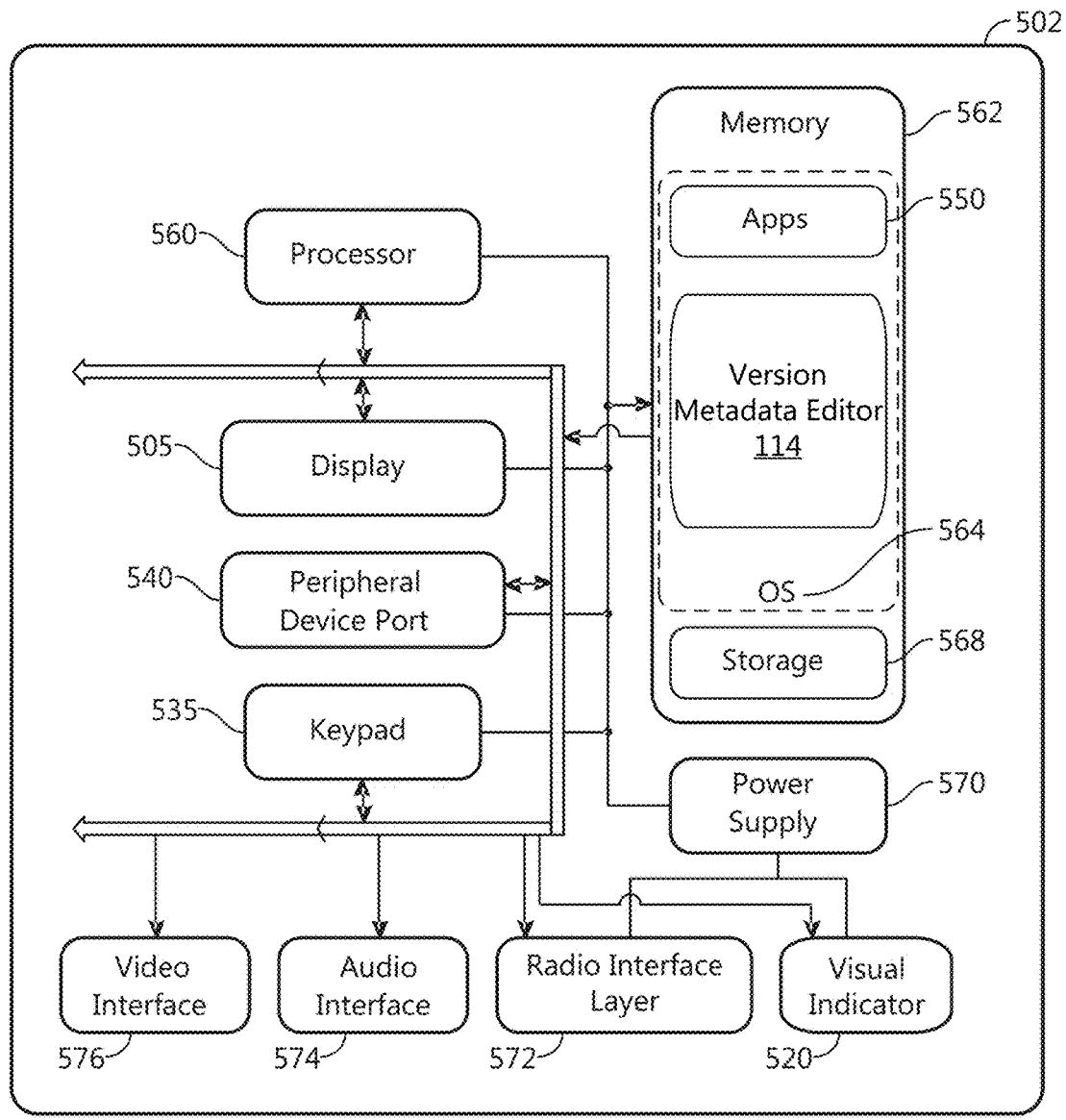
Figure 6:
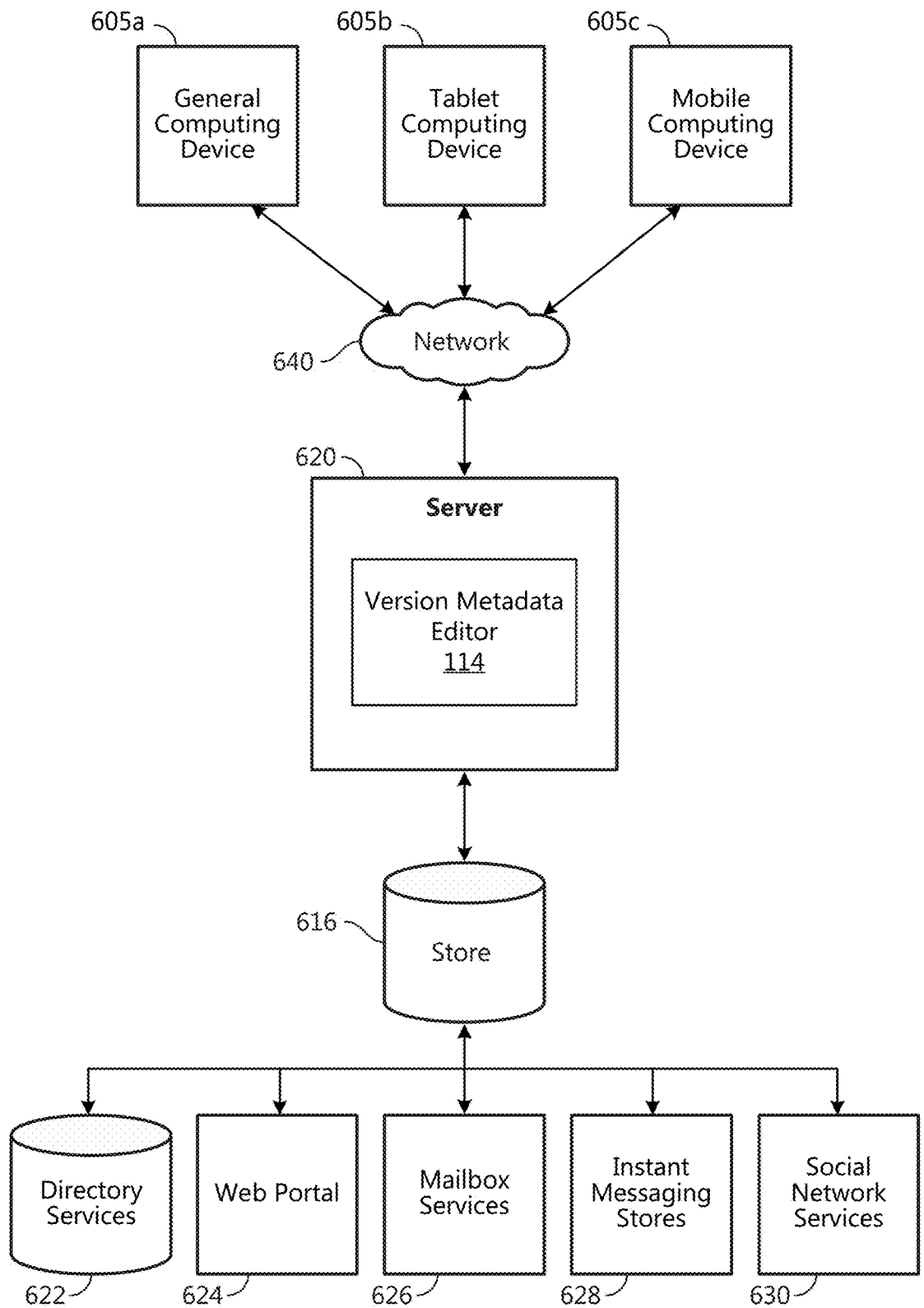
FIG. 6 is a block diagram of a distributed computing system.

FIGS. 4-6 and the associated descriptions provide a discussion of a variety of operating environments in which examples are practiced. However, the devices and systems illustrated and discussed with respect to FIGS. 4-6 are for purposes of example and illustration and are not limiting of a vast number of computing device configurations that are utilized for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes the version metadata editor 114. The operating system 405, for example, is suitable for controlling the operation of the computing device 400. Furthermore, aspects are practiced in conjunction with a graphics library, other operating systems, or any other application program, and is not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., version metadata editor 114) perform processes including, but not limited to, one or more of the stages of the method 300 illustrated in FIGS. 3A-3D. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 4 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 400 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, radio frequency (RF) transmitter, receiver, and/or transceiver circuitry; universal serial bus (USB), parallel, and/or serial ports.

The term computer readable medium, as used herein, includes computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage medium is part of the computing device 400. Computer storage media do not include a carrier wave or other propagated data signal.

According to an aspect, communication media are embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which aspects may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or fewer input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a graphical user interface (GUI), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 500 incorporates peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA) and wireless phone.

According to an aspect, one or more application programs 550 are loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. According to an aspect, the version metadata editor 114 is loaded into memory 562. The system 502 also includes a non-volatile storage area 568 within the memory 562. The non-volatile storage area 568 is used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

According to an aspect, the visual indicator 520 is used to provide visual notifications and/or an audio interface 574 is used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 are stored locally on the mobile computing device 500, as described above. According to another aspect, the data are stored on any number of storage media that are accessible by the device via the radio 572 or via a wired connection between the mobile computing device 500 and a separate computing device associated with the mobile computing device 500, for example, a server computer in a distributed computing network, such as the Internet. As should be appreciated such data/information are accessible via the mobile computing device 500 via the radio 572 or via a distributed computing network. Similarly, according to an aspect, such data/information are readily transferred between computing devices for storage and use according to well-known data/information transfer and storage means, including electronic mail and collaborative data/information sharing systems.

FIG. 6 illustrates one example of the architecture of a system for providing discoverability of and persisting a document version 120 in a document version history 202 as described above. Content developed, interacted with, or edited in association with the version metadata editor 114 is enabled to be stored in different communication channels or other storage types. For example, various documents may be stored using a directory service 622, a web portal 624, a mailbox service 626, an instant messaging store 628, or a social networking site 630. The version metadata editor 114 is operative to use any of these types of systems or the like for providing discoverability of and persisting a document version 120 in a document version history 202, as described herein. According to an aspect, a server 620 provides the version metadata editor 114 to clients 605a,b,c. As one example, the server 620 is a web server providing the version metadata editor 114 over the web. The server 620 provides the version metadata editor 114 over the web to clients 605 through a network 640. By way of example, the client computing device is implemented and embodied in a personal computer 605a, a tablet computing device 605b or a mobile computing device 605c (e.g., a smart phone), or other computing device. Any of these examples of the client computing device are operable to obtain content from the store 616.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method for providing document version discoverability and persistence, comprising:
   opening a document with a document editing application;
   displaying the opened document in a document editing window of a user interface of the document editing application along with a selectable version history element, the selectable version history element being selectable to initiate display of a document version history listing of the opened document;
   receiving a selection of the selectable version history element;
   in response to receipt of the selection of the selectable version history element, querying a storage repository for versions of the opened document;
   generating and displaying in the user interface of the document editing application a list of document versions of the opened document, based on the results of querying the storage repository, while concurrently displaying the opened document;
   receiving a selection of a document version of interest from the list of document versions;
   in response to receipt of the selection of the document version of interest, newly displaying within the user interface of the document editing application a selectable option to add identification metadata to the document version of interest;
   receiving a selection of the option to add identification metadata to the document version of interest;
   in response to receipt of the selection of the option to add identification metadata to the document version of interest, newly displaying within the user interface of the document editing application, while concurrently displaying the opened document and the list of document versions, a text input box;
   receiving a text input in the displayed text input box;
   saving the text input as the identification metadata associated with the document version of interest; and
   updating the displayed list of document versions to include a display of the text input as associated with the document version of interest.

2. The computer-implemented method of claim 1, wherein the list of document versions further includes a display of a date and time of creation for each of the document versions.

3. The computer-implemented method of claim 1, wherein querying the storage repository for the document versions associated with the opened document further comprises querying the storage repository for the metadata associated with the document versions associated with the opened document.

4. The computer-implemented method of claim 3, wherein querying the storage repository for the metadata associated with the document versions associated with the opened document comprises querying the storage repository for an identification metadata associated with the document versions associated with the opened document.

5. The computer-implemented method of claim 1,
   wherein saving the text input as the identification metadata designates the version of interest as a priority version; and the method further comprising:

receiving an indication of a purge event to purge versions of the document and, in response to the received indication, determining if versions of the document are priority versions, and purging versions of the document not determined to be priority versions.

6. The computer-implemented method of claim 1, wherein the displayed list of document versions includes for each document version an indicator indicating an activity or event that triggered a creation of a respective document version.

7. The computer-implemented method of claim 6, wherein the indicator indicating the activity or event that triggered the creation of the respective document version comprises an icon or a glyph.

8. The computer-implemented method of claim 1, wherein, in response to receipt of the selection of the document version of interest, newly displaying within the user interface of the document editing application a selectable option to share the selected document version of interest while concurrently displaying the opened document and the list of document versions.

9. The computer-implemented method of claim 8, wherein, in response to receipt of the selection of the document version of interest, newly displaying within the user interface of the document editing application a selectable option to copy the selected document version of interest while concurrently displaying the opened document and the list of document versions.

10. A system for providing document version discoverability and persistence, comprising:
   a memory storing instructions;
   a display device; and
   a processor coupled to the display device and to the memory, wherein execution of the stored instructions by the processor causes the processor to perform:
   opening a document with a document editing application and displaying the opened document in a user interface of the document editing application;
   receiving a selection of a version history element, the selection made via the user interface of the document editing application, wherein selection of the version history element initiates a display of a document version history listing of the opened document;
   in response to receipt of the selection of the version history element, querying a storage repository for versions of the opened document;
   generating a list of document versions associated with the opened document for display in the user interface of the document editing application based on the results of querying the storage repository;
   displaying the list of document versions of the opened document while concurrently displaying the opened document within the user interface of the document editing application;
   receiving an indication of a selection of a document version of interest from the list of document versions;
   in response to receipt of the selection of a document version of interest, displaying within the user interface of the document editing application, concurrently with the displayed opened document and with the displayed list of document versions of the opened document, a selectable option to add identification metadata to the document version of interest;
   receiving a selection of the option to add identification metadata to the document version of interest;
   in response to receipt of the selection of the option to add identification metadata to the document version of interest, newly displaying within the user interface of the document editing application a text input box, wherein the newly displayed text input box is displayed concurrently with the displayed opened document and the displayed list of document versions;
   receiving a text input in the text input box;
   saving the text input as the identification metadata associated with the version of interest; and
   updating the displayed list of document versions to include a display of the text input as associated with the document version of interest.

11. The system of claim 10, wherein displayed list of document versions includes a date and time associated with a creation of each of the versions.

12. An article of manufacture comprising computer storage media containing computer executable instructions, wherein a computer executing the computer executable instructions is caused to perform a method for providing document version discoverability and persistence, the method comprising:
   opening a document with a document editing application;
   displaying the opened document in an editing window of a user interface of the document editing application along with a selectable version history element, wherein selection of the selectable version history element initiates a display of a document version history listing of the opened document;
   receiving a selection of the selectable version history element;
   in response to the receipt of the selection of the selectable version history element, querying a storage repository for document versions associated with the opened document and for metadata associated with the document versions;
   generating and displaying a list of document versions of the opened document and the metadata associated with the respective document versions based on the results of querying the storage repository, wherein the displayed list of document versions is displayed concurrently with the opened document within the user interface of the document editing application;
   receiving a selection of a document version of interest from the list of document versions;
   in response to receiving the selection of the document version of interest, newly displaying within the user interface of the document editing application a selectable option to add identification metadata to the document version of interest;
   in response to receipt of the selection of the option to add identification metadata to the document version of interest, newly displaying within the user interface of the document editing application a text input box;
   receiving a text input in the text input box; saving the text input as an identification metadata associated with the document version of interest; and
   updating the displayed list of document versions to include a display of the text input as associated with the document version of interest.

\* \* \* \* \*